United States Patent
Johnson et al.

(10) Patent No.: US 9,574,086 B2
(45) Date of Patent: *Feb. 21, 2017

(54) PLASMA REACTOR

(71) Applicant: Monolith Materials, Inc.

(72) Inventors: Peter L. Johnson, Mountain View, CA (US); Robert J. Hanson, San Carlos, CA (US); Roscoe W. Taylor, San Mateo, CA (US)

(73) Assignee: MONOLITH MATERIALS, INC., Redwood City, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/601,793

(22) Filed: Jan. 21, 2015

(65) Prior Publication Data

US 2015/0218383 A1    Aug. 6, 2015

Related U.S. Application Data

(60) Provisional application No. 61/934,207, filed on Jan. 31, 2014.

(51) Int. Cl.
*C09C 1/48* (2006.01)

(52) U.S. Cl.
CPC ................................... *C09C 1/485* (2013.01)

(58) Field of Classification Search
CPC ..................................................... C09C 1/485
See application file for complete search history.

(56) References Cited

U.S. PATENT DOCUMENTS

| | | | |
|---|---|---|---|
| 1,339,225 A | 5/1920 | Rose | |
| 1,536,612 A | 5/1925 | Lewis | |
| 1,597,277 A | 8/1926 | Jakowsky | |
| 2,002,003 A | 5/1935 | Eisenhut et al. | |
| 2,572,851 A | 10/1951 | Gardner et al. | |
| 2,616,842 A | 11/1952 | Sheer et al. | |
| 3,009,783 A | 11/1961 | Sheer et al. | |
| 3,073,769 A | 1/1963 | Doukas | |
| 3,288,696 A | 11/1966 | Orbach | |
| 3,344,051 A | 9/1967 | Latham, Jr. | |
| 3,408,164 A | 10/1968 | Johnson | |
| 3,409,403 A | 11/1968 | Bjornson et al. | |
| 3,420,632 A | 1/1969 | Ryan | |
| 3,431,074 A | 3/1969 | Jordan | |
| 3,464,793 A | 9/1969 | Jordan et al. | |
| 3,619,140 A | 11/1971 | Morgan et al. | |
| 3,725,103 A | 4/1973 | Jordan et al. | |
| 3,922,335 A | 11/1975 | Jordan et al. | |
| 4,035,336 A | 7/1977 | Jordan et al. | |
| 4,101,639 A | 7/1978 | Surovikin et al. | |
| 4,472,172 A | 9/1984 | Sheer et al. | |
| 4,601,887 A | 7/1986 | Dorn et al. | |
| 5,481,080 A | 1/1996 | Lynum et al. | |
| 5,486,674 A | 1/1996 | Lynum et al. | |
| 5,500,501 A | 3/1996 | Lynum et al. | |
| 5,527,518 A | 6/1996 | Lynum et al. | |
| 5,725,616 A | 3/1998 | Lynum et al. | |
| 5,951,960 A | 9/1999 | Lynum et al. | |
| 5,989,512 A | 11/1999 | Lynum et al. | |
| 5,997,837 A | 12/1999 | Lynum et al. | |
| 6,068,827 A | 5/2000 | Lynum et al. | |
| 6,099,696 A | 8/2000 | Schwob et al. | |
| 6,358,375 B1 | 3/2002 | Schwob | |
| 6,395,197 B1 | 5/2002 | Detering et al. | |
| 6,773,689 B1 | 8/2004 | Lynum et al. | |
| 7,452,514 B2 | 11/2008 | Fabry et al. | |
| 7,462,343 B2 | 12/2008 | Lynum et al. | |
| 7,655,209 B2 | 2/2010 | Rumpf et al. | |
| 8,147,765 B2 | 4/2012 | Muradov et al. | |
| 8,221,689 B2 | 7/2012 | Boutot et al. | |
| 8,277,739 B2 | 10/2012 | Monsen et al. | |
| 8,486,364 B2 | 7/2013 | Vanier et al. | |
| 8,771,386 B2 | 7/2014 | Licht et al. | |
| 8,784,617 B2 | 7/2014 | Novoselov et al. | |
| 8,911,596 B2 | 12/2014 | Vancina | |
| 2004/0148860 A1 | 8/2004 | Fletcher | |
| 2007/0183959 A1 | 8/2007 | Charlier et al. | |
| 2008/0226538 A1 | 9/2008 | Rumpf et al. | |
| 2008/0279749 A1 | 11/2008 | Probst et al. | |
| 2009/0142250 A1 | 6/2009 | Fabry et al. | |
| 2011/0239542 A1 | 10/2011 | Liu et al. | |
| 2014/0373752 A2 | 12/2014 | Hassinen et al. | |

FOREIGN PATENT DOCUMENTS

| | | |
|---|---|---|
| AU | 28970/71 A | 11/1972 |
| CA | 830378 A | 12/1969 |
| CA | 964405 A1 | 3/1975 |
| CA | 2 353 752 A1 | 1/2003 |
| CA | 2 621 749 A1 | 8/2009 |
| CN | 1644650 A | 7/2005 |
| CN | 102108216 A | 6/2011 |
| CN | 102993788 A | 3/2013 |
| CN | 103160149 A | 6/2013 |
| CN | 203269847 U | 11/2013 |
| EP | 0 616 600 A1 | 9/1994 |
| EP | 0 635 044 B1 | 2/1996 |
| EP | 0 635 043 B1 | 6/1996 |
| EP | 0 861 300 A1 | 9/1998 |
| FR | 2 891 434 A1 | 3/2007 |
| FR | 2 937 029 A1 | 4/2010 |
| GB | 1 400 266 A | 7/1975 |
| GB | 1 492 346 A | 11/1977 |
| JP | 6-322615 A | 11/1994 |
| JP | 2004-300334 A | 10/2004 |
| KR | 10-2008-105344 A | 12/2008 |
| WO | 93/12031 | 6/1993 |
| WO | 97/03133 | 1/1997 |
| WO | 2012/015313 A1 | 2/2012 |
| WO | 2012/094743 A1 | 7/2012 |
| WO | 2012/149170 A1 | 11/2012 |
| WO | 2013/184074 A1 | 12/2013 |
| WO | 2013/185219 A1 | 12/2013 |
| WO | 2014/012169 A1 | 1/2014 |

*Primary Examiner* — Stuart Hendrickson
(74) *Attorney, Agent, or Firm* — Greenblum & Bernstein, P.L.C.

(57) ABSTRACT

A method of making carbon black. Such method is described including generating a plasma by subjecting a plasma gas to a plasma arc, mixing a feedstock material with the plasma gas and combining the mixture in a reactor at a given reactor temperature to produce carbon black, wherein the feedstock is mixed with the plasma gas outside of the area occupied by the plasma arc. The carbon black produced by such process is also described.

4 Claims, 1 Drawing Sheet

PLASMA REACTOR

CROSS-REFERENCE TO RELATED APPLICATIONS

The present application claims benefit under 35 U.S.C. §119(e) of U.S. Provisional Application No. 61/934,207 filed Jan. 31, 2014, the disclosure of which is expressly incorporated by reference herein in its entirety.

TECHNICAL FIELD

The field of art to which this invention generally pertains is methods and apparatus for making use of electrical energy to effect chemical changes.

BACKGROUND

There are many processes that can be used and have been used over the years to produce carbon black. The energy sources used to produce such carbon blacks over the years have, in large part, been closely connected to the raw materials used to convert hydrocarbon containing materials into carbon black. Residual refinery oils and natural gas have long been a resource for the production of carbon black. Energy sources have evolved over time in chemical processes such as carbon black production from simple flame, to oil furnace, to plasma, to name a few. As in all manufacturing, there is a constant search for more efficient and effective ways to produce such products. Varying flow rates and other conditions of energy sources, varying flow rates and other conditions of raw materials, increasing speed of production, increasing yields, reducing manufacturing equipment wear characteristics, etc. have all been, and continue to be, part of this search over the years.

The systems described herein meet the challenges described above, and additionally attain more efficient and effective manufacturing process.

BRIEF SUMMARY

A method of making carbon black is described including generating a plasma by subjecting a plasma gas to a plasma arc, mixing a feedstock material with the plasma gas and combining the mixture in a reactor at a given reactor temperature to produce carbon black, wherein the feedstock is mixed with the plasma gas outside of the area occupied by the plasma arc.

Additional embodiments include: the method described above where the feedstock is natural gas; the method described above where the natural gas and plasma are mixed at a high intensity; the method described above where the mixing is turbulent; the method described above resulting in substantial elimination of torch fouling; the method described above resulting in the production of high quality carbon black, having more uniform time temperature carbon black production history, higher surface area per degree of reactor temperature, higher surface area per specific energy input, higher product structure, higher tinting strength, reduced product grit, and reduced product extract; the method described above where the feedstock is injected so as to fully form the carbon black product prior to contact with any solid surface present in the reactor; the method described above where increasing the reactor temperature reduces the required time for the carbon black product to fully form; the method described above where the carbon black product produced is quenched after sufficient residence time in the reactor so as to reduce product extract levels; the carbon black product produced by the processes described above.

DETAILED DESCRIPTION

Figure 1:
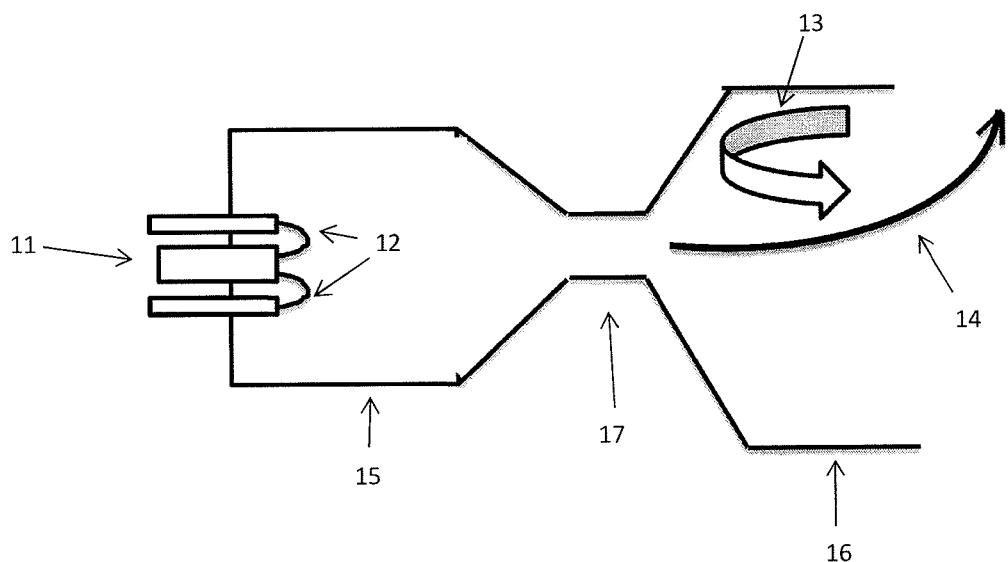
FIG. 1 shows a schematic representation of a system as described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

As described herein, controlling the design parameters of a plasma reactor as described below results in the production of high quality carbon blacks having the properties described herein. Prevention of feedstock or formed product entering the plasma arc prevents fouling of the torch and enables a more uniform time temperature history of the feedstock/product. Intense mixing of, for example, natural gas feedstock and plasma gases can maximize surface area, tint and structure as well as minimizing extract for a given reactor temperature and reduce the temperature variation the product forms in. Sufficient time of flight from feedstock injection to solid surface contact so as to fully form the product prior to contact with the solid surface results in the improved properties described herein. This will require longer times when operating at lower temperatures and/or less intense mixing. And sufficient residence time prior to quenching reduces product extract levels to those required by the market.

There are clearly benefits of separating the plasma arc from the feedstock. Previous methods of using a plasma to make carbon black products have not recognized the link intense mixing has to the product quality recognized herein and especially the benefits of turbulent mixing rather than laminar or transitional mixing. Mixing will definitely impact surface area, but will also impact the structure, tinting strength, and extract levels, among other things. Similarly, linking time of flight from feedstock injection to the wall has a significant impact on product grit and reactor fouling. Other significant benefits include, reducing the time of flight required by improving the mixing, how increased reactor temperature reduces the required time of flight, linking residence time at temperature with product extract levels, and reducing the extract level by improving the mixing.

The processes as described herein also overcome generated products that suffered from one or more of the following: low surface area vs reactor temperature, and hence low surface area for a specific energy input; low product structure even when not using any structure control additives, high product grit, and high product extract.

Example 1

In FIG. 1, the plasma torch (11) is shown generating an arc (12) in the plasma torch chamber (15). The use of a restriction (17) between the plasma torch chamber and the reactor chamber (16) helps prevent any feedstock or carbon black getting back to the plasma arc where it could decompose, crack and/or and foul the torch. The recirculation (13) helps keep the forming carbon black particles (14) more towards the middle of the chamber away from the walls. The restriction also accelerates the fluid to create turbulent mixing conditions, which reduces the time taken to heat the feedstock, resulting in a more uniform time temperature history. This faster mixing also increases the surface area, structure, and tint, and reduces the time to form the black and so reduces the grit and extract as well as coke deposits and other fouling on the reactor walls. By producing higher surface area at the same reactor temperature, the energy required per amount of product for a given surface area is minimized. The expansion from the restriction creates recirculation, keeping the forming product away from the walls of the reactor while also minimizing the reactor's surface area for a given volume/residence time, which minimizes heat losses as well.

Example 2

Figure 2:
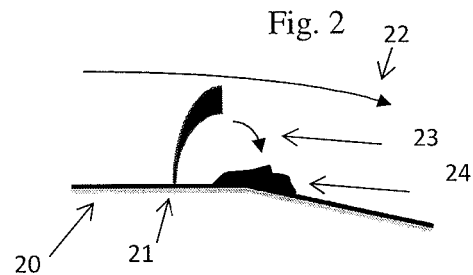
FIGS. 2 and 3 show schematic representations of gas non-recirculation and recirculation as described herein.
Figure 3:
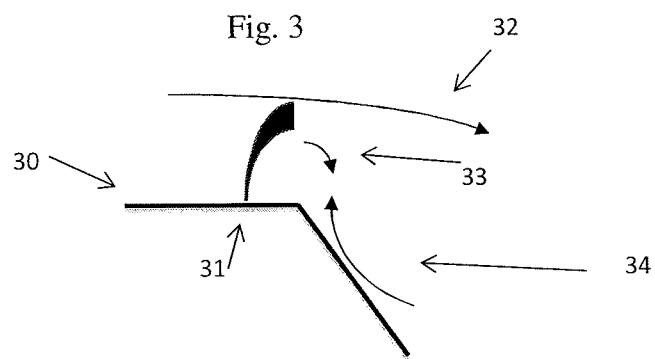

In FIG. 2, insufficient recirculation occurs. The bulk of the flow of plasma gases (22) remains attached to the wall (20), i.e. follows the wall. The injection of feedstock such as natural gas, oil, etc. (21) results in a wake (23) that sucks a portion of the feedstock onto the wall where it will form coke (24) that may plug the restriction and/or increase the grit level in the product (most grit being coke). Conversely, in FIG. 3 the larger angle of expansion in the wall (30) results in the flow of plasma gasses (32) detaching from the wall (30) creating recirculation (34). The recirculated gases (34) from the reactor, that contain fully formed product, then counter the tendency of the wake (33) of the injected natural gas or oil (31) to suck some of the natural gas/oil towards the wall (33). This would also favor placing the feedstock injection point somewhat close to the end of the restriction between the plasma chamber and the reactor so that the recirculated gasses and fully formed black (34) essentially fill the wake of the injected feedstock (33).

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making carbon black comprising generating a torch plasma by subjecting a plasma gas to a plasma arc, mixing a feedstock material with the plasma gas and combining the mixture in a reactor at a given reactor temperature to produce carbon black, wherein the torch plasma is generated in a first plasma chamber area, and the feedstock is mixed with the plasma gas in a second reactor chamber area separated from the first plasma chamber area by a third restricted area which causes turbulent mixing of the feedstock with the torch plasma in the second reactor chamber area resulting in reduced and substantial elimination of reactor wall and torch fouling.

2. The method of claim 1, wherein the feedstock is natural gas.

3. The method of claim 1 resulting in the production of carbon black having more uniform time temperature carbon black production history, higher surface area per degree of reactor temperature, higher surface area per specific energy input, higher product structure, higher tinting strength, reduced product grit, and reduced product extract as compared to carbon black produced without said turbulent mixing.

4. The method of claim 1 wherein the feedstock is injected so as to fully form the carbon black product prior to contact with any solid surface present in the reactor chamber area.

* * * * *